UNITED STATES PATENT OFFICE.

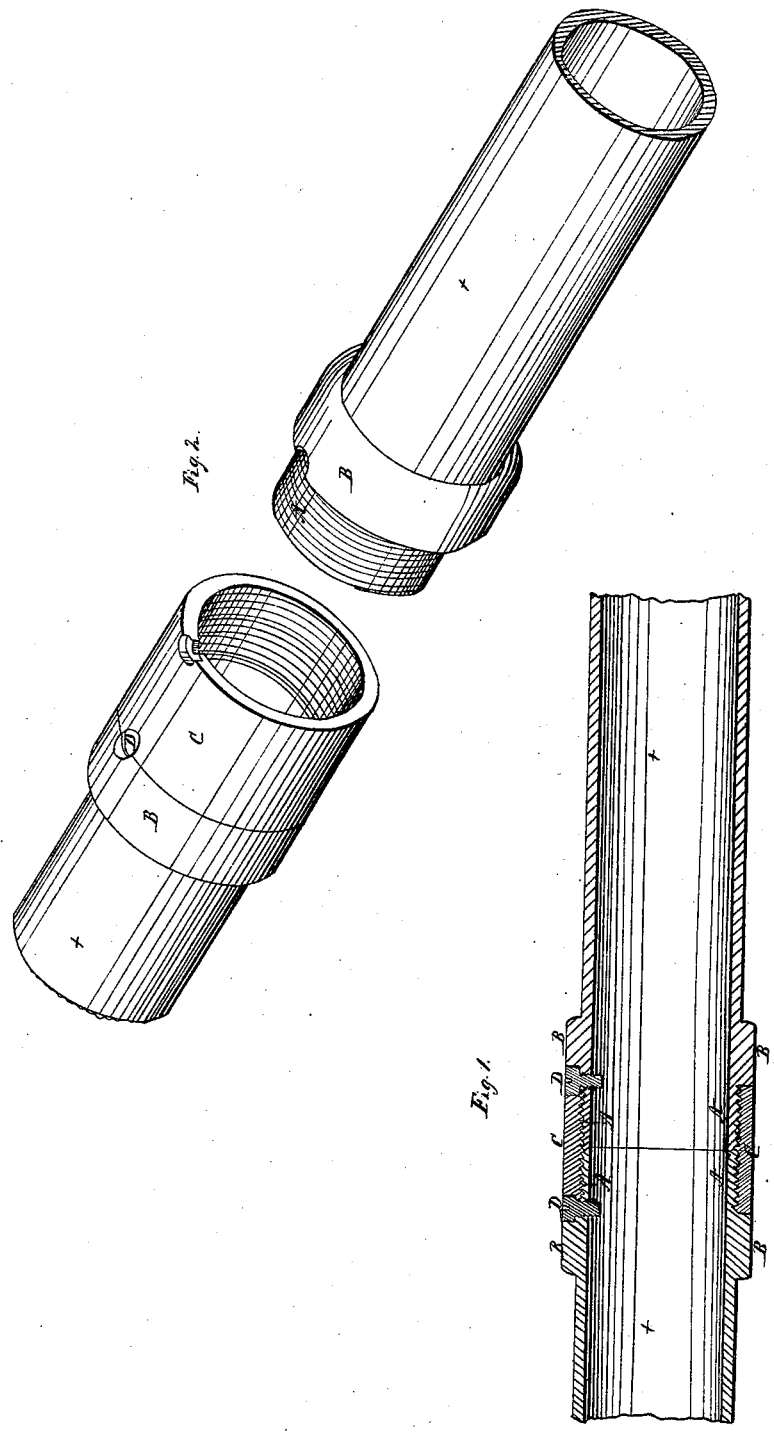
Z. Allen,
Shaft Coupling.
Nº 18,006.
Patented Aug. 18, 1857.

Z. ALLEN, OF PROVIDENCE, RHODE ISLAND.

TUBULAR SHAFTING FOR MILLS, &c.

Specification of Letters Patent No. 18,006, dated August 18, 1857.

*To all whom it may concern:*

Be it known that I, ZACHARIAH ALLEN, of the city of Providence and State of Rhode Island, have invented a new and useful Improvement in Mill-Shafting, of which the following is a clear and exact description, reference being had to the accompanying drawing, which makes a part of this specification.

Heretofore lines of solid iron shafts, with pulleys fixed thereon, have been used to operate the machinery of mills, and lines of shafting composed of parts alternately tubular and solid, with pulleys fixed thereon, have been suggested for that purpose. The axles of paddle-wheels, and carriages, the mandrels of lathes, &c., have been made tubular, but all these are materially different from a continuous tube or hollow shaft with a turned or smoothed surface forming of itself throughout its whole length a combined mill-shaft-and-pulley, or belt-drum, and this combined shaft and pulley constitutes my improvement.

My improved shafting may have its sections united by any suitable coupling, but a strong and convenient one, which I have used successfully, is made as follows:

Each end of the tube is fitted with a screw A, and collar or shoulder B, as shown in the drawing, the threads of the screws being cut in such relative directions that the joints will become tightened by being turned in the direction in which the shaft is destined to revolve, right hand screws being made for uniting the ends of the shafts which are to be turned to the right, and left hand screws for those to be turned to the left. The adjacent ends of any two of the lengths of tubes are screwed into the opposite ends of a coupling C, which forms a nut to unite them firmly.

In the joint between the coupling C, and collar B, a check-screw D, is inserted, one half of which is embedded in the coupling and the other half in the collar. This check-screw prevents the joints from being unscrewed by the backlash or momentum of the driven machinery whenever the motor, which drives the machinery, has its speed suddenly slackened, or is suddenly stopped.

This combined shaft and drum is to be so truly turned and adjusted to bearings, constructed in the same manner as those for solid shafting, that a long line of it may revolve with unwavering steadiness, so as to appear motionless, when viewed from a short distance. The ends of the hollow shafting should be left open for the free circulation of the air throughout the interior of the journals, to keep them cool while rapidly revolving.

In the accompanying drawing Figure 1, represents a longitudinal section of a portion of a line shaft and pulley, including one of the joints by which two adjacent lengths of the shafts and pulley are united. Fig. 2 represents a view in perspective of the same parts, one of the lengths of the drum being withdrawn from the collar which unites them, as shown in Fig. 1.

I claim as my invention, and desire to secure by Letters Patent—

The improved hollow shafting, above described, forming a continuous line of mill shaft and pulley or belt drum, substantially as herein set forth.

In testimony whereof, I have hereunto subscribed my name.

ZACHARIAH ALLEN.

Witnesses:
NATHANIEL SEARLE,
P. H. WATSON.